Figure 1:
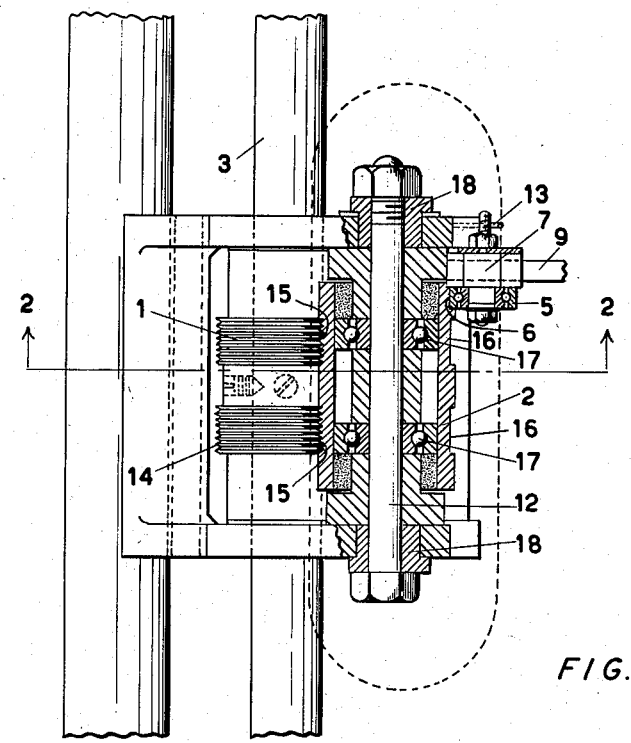

April 15, 1952  C. F. WEBB  2,593,078
ROTARY TICKET PRINTING AND MUTILATING MACHINE
Filed Feb. 12, 1948

INVENTOR.
CHRISTOPHER FREDERICK WEBB
BY
ATTORNEYS

Patented Apr. 15, 1952

2,593,078

UNITED STATES PATENT OFFICE 2,593,078

ROTARY TICKET PRINTING AND MUTILATING MACHINE

Christopher Frederick Webb, London, England, assignor to General Register Corporation, Long Island City, N. Y., a corporation of New York Application February 12, 1948, Serial No. 7,981
In Great Britain April 18, 1947

3 Claims. (Cl. 101—23)

This invention is for improvements in or relating to totalisator systems in which the person placing a bet is issued a ticket upon which certain essential data are set forth. Such a ticket if issued in respect of a winning competitor, possesses an exchange value in excess of the bet made. Each ticket issued from a totalisator system contains certain essential particulars which if altered, could be made to vary the exchange value of the ticket. Thus, each ticket issued from a totalisator booth might contain, for example, the following data:

(a) A code word indicating the date upon which the ticket was issued;

(b) A number allocated to a competitor;

(c) A number indicating the race in which the competitor is taking part;

(d) A word, for example Forecast, Win or Place, to indicate the character of the bet, and (e) Monetary value.

It will be observed that a person in possession of a ticket issued upon a day other than the day upon which a particular race was run, could fraudulently alter the code word upon the ticket so as to make the ticket appear applicable to the day of the particular race and this alteration might be sufficient to enable the person to present what appeared to be a winning ticket at the booth. Again a person might obtain a ticket on the appropriate day of a particular case in respect of a particular horse and if the number of the horse were altered again the person might be able to convert a valueless ticket into a ticket having a high exchange value. In exactly the same way it might be possible to change the number of the race or the character of the bet or it might be possible to alter two or more of such essential particulars and so present to the official in charge of the booth a ticket which normally would be valueless but as a result of his fraudulent alteration, has been given the appearance of a winning ticket.

The object of the present invention is to provide a totalisator system in which the fraudulent alteration of an essential particular or essential particulars of a ticket is or are rendered extremely difficult, if not impossible.

According to the one feature of the present invention, a ticket of the above character is protected against fraudulent alteration of an essential particular or particulars thereof by scoring, ribbing, embossing or otherwise mutilating the surface of at least that part of the ticket which if successfully altered, could change the exchange value of such ticket.

The object of the invention can be effected by scoring, ribbing, embossing or otherwise mutilating the surface of the ticket only at that part where it would have to be altered in order to effect an alteration to its exchange value, while tickets carrying two or more separate sets of essential particulars could have the areas thereof scored, ribbed, embossed or otherwise mutilated so as to leave clear margins between them in order to avoid undue weakening of the ticket structure.

According to another feature of the present invention, a ticket issuing machine for a totalisator system may be provided with a pair or pairs of inversely rotatable delivery rollers having the peripheral surfaces thereof ribbed or otherwise profiled and thus adapted to engage firmly a ticket issued from the machine to ensure that the ticket is positively delivered and in being so delivered is scored, ribbed, embossed or otherwise mutilated at a predetermined part or parts thereof. The said pair of delivery rollers may comprise a continuously driven roller and an intermittently rotatable roller which is adapted to be driven from the continuously driven roller through the medium of the ticket engaged between them and each of the rollers may be provided with groups of projections or with annular or helical ribs which extend around the periphery of the roller and are adapted to interengage or intermesh with similar peripheral projections or ribs carried by the other roller of the pair.

According to the present invention, there is provided in a totalisator system means whereby an essential particular or particulars of a ticket issued by the system is or are mutilated so as to render the fraudulent alteration of such particular or particulars difficult, if not impossible.

In applying the invention to a totalisator system employing a power-driven key-operated rotary ticket and printing issuing machine operable to issue comparatively thin paper tickets carrying variable data, the cooperating pair of inversely rotatable delivery rollers between which each ticket is engaged as it emerges from between the printing couple may conveniently comprise a positively driven roller mounted upon a continuously driven spindle and a cooperating roller which is mounted upon a spindle upon which it is free to rotate. Both rollers are provided with annular ribs which are appropriately pitched so that the ribs of the one roller intermesh with the ribs of the other without directly contacting one another. Thus, the freely rotatable roller can be held stationary until a ticket is engaged between the rollers, whereupon the drive of the positively driven roller is transmitted through the ticket to the freely rotatable roller, whereupon the latter is rotated and longitudinally extending ribs, scores or grooves are formed in the ticket passing between the said rollers.

The pair of rollers are mounted so that the intermeshing ribs thereof are in register with the impression areas of the printing plate carried by the printing wheel of the ticket issuing and printing couple, while the freely rotatable roller may be mounted in eccentric bearings which provide means for conveniently adjusting the degree of pressure between the two rollers.

The freely rotatable roller may have one or more axial flutes or grooves formed in its peripheral surface in order to interrupt or gap the annular ribs thereof and correspondingly to interrupt the ribbing, scoring or grooving effected thereby upon the tickets.

By controlling the extent of the rotation of the gapped, freely rotatable roller during the passage of each ticket between the pair of rollers, the said ribbing, scoring or grooving may be effected along only a part of the length of each ticket, while by appropriately registering the said gapped roller in predetermined annular relation to the commencement of the engagement of the ticket between the pair of rollers the ribbing, scoring or grooving may be selectively applied to the same portions, for example that portion or those portions of each ticket which carry the essential particulars or particular.

The means for controlling the rotation and registering the said gapped roller may comprise a locking roller carried by a pivotal arm or detent carriage and adapted to contact with and follow an end part of the peripheral surface of the gapped roller and to engage in a dimple or locating recess therein. A rigid or resilient finger forming an integral part of or secured to the said pivotal arm or detent carriage may be disposed for engagement by the marginal edge of the arcuate printing plate or an equivalent cam-like surface carried by the intermittently rotatable printing wheel of the machine and the arrangement may conveniently be such that the said finger will be intermittently acted upon by the edge of the printing plate or equivalent surface in order to retain the roller in position in the dimple in the said gapped roller thus to lock the latter against rotation and to locate it with the axial gap or one of such gaps disposed in relation to the bite of the pair of rollers so as to provide a partial clearance between the intermeshing ribs of the rollers and to relieve some part of the ticket from the indenting or scoring action of the rollers when the printing plate is idle. Conversely, whilst the printing plate is printing the ticket or moving into or out of printing position the trailing finger is relieved from pressure and the locking roller then only retains the gapped roller due to light spring pressure until the introduction of the ticket between the rollers overcomes the locking roller and rotates the free gapped roller thereby bringing the ribbed portion thereof into engagement with the ticket and into intermeshing relation with the ribs of the continuously driven roller.

The relative speeds of rotation of the rollers and printing wheel may be so chosen that the gapped roller is permitted to perform the complete revolution in each ticket printing operation. Furthermore, the circumferential length of the freely rotatable roller may be so chosen and the gaps in the ribs thereof so arranged in relation to the lay-out of the printing plate surface that the ribbing, scoring or grooving may be effected substantially in the impression areas of the variables printed upon the ticket. For example, in printing a typical totalisator ticket for use in a horse race or dog race, the ticket may have printed upon one end part thereof three banks or rows of variables comprising (a) the number of the runner, (b) the number or identifying symbol of the race and (c) the word Forecast, Win or Place and the scoring, ribbing or grooving may be caused to extend longitudinally across the inked faces of the said variable impressions and to terminate more or less at the edges of the said impression areas thus leaving relatively smooth surface transverse margins between the said areas.

Intaglio or open type printing plates may be employed in the printing of the tickets and as a further precaution color faced paper may be used.

The invention is not confined to totalisator systems employing rotary printing machines but may be carried into effect with systems employing platen printing machines.

Furthermore, it may be found to be convenient in some instances, for example, when applying the invention to totalisators employing platen printing machines, to effect the mutilation of the surfaces of the tickets whilst the latter are stationary.

Figure 2:
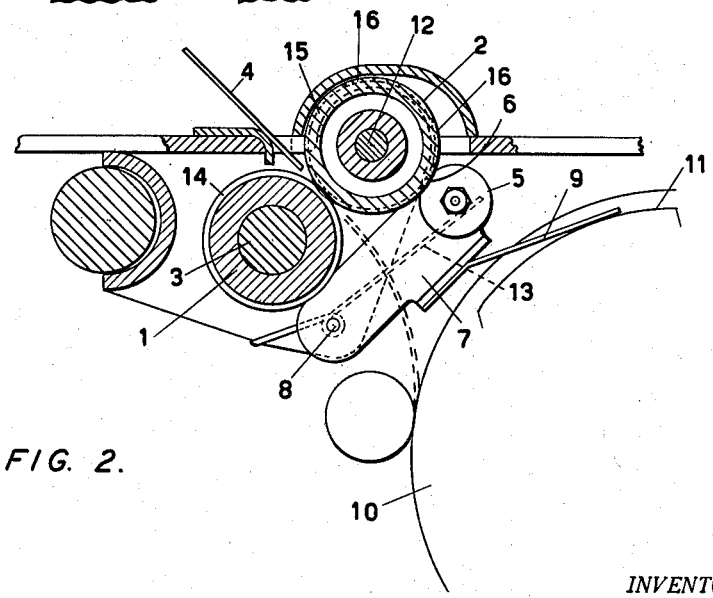

The invention will be more particularly described with reference to the accompanying drawings, in which:

Figure 1 illustrates in part sectional plan view the mechanism whereby the surface of a ticket may be mutilated as it is being issued from a rotary ticket printing and issuing machine of a totalisator system; and Figure 2 is a vertical section taken on the plane indicated at 2—2 in Figure 1.

Referring to the drawings, there is illustrated merely one method of carrying the invention into effect in conjunction with a rotary ticket printing and issuing machine of the type employed in a totalisator system. Such ticket printing and issuing machines are so well known in the art as not to need detailed description. However, one specific embodiment of such a machine is to be found in United States Patent 2,026,763, issued to Christopher F. Webb, January 7, 1936, although it will be readily appreciated by those skilled in the art that the invention is not limited to such a machine or even to a rotary ticket printing and issuing machine.

In the embodiment of the invention illustrated in the drawings, a ticket, after having been printed and severed from a web is fed to a pair of rollers 1 and 2. The roller 1 is mounted upon a spindle 3 which is constantly rotated from the main drive of the machine. The roller 2 is normally disposed in spaced relationship to the rotating surface of the roller 1 but is so arranged that when a ticket 4 is fed to the rollers 1 and 2, the said rollers bite the ticket between them and feed it forwardly, the roller 2 being driven by the roller 1 through the intermediary of the ticket 4. The roller 1 is provided with peripheral ribs 14 which mesh with lands 15 on roller 2. Axial cut-out portions 16 in roller 2 form gaps in the peripheral course of the lands. When these cut-out portions are opposite ribs 14, no substantial mutilation will occur, though, by close adjustment, slight grooves may occur in the ticket due to pressure of the ribs 14 on the ticket, pressing it against the portions 16 of roller 2. Thus when a ticket is fed between the rollers there are formed between predetermined portions of the ticket, ribbing, scoring or grooving, sufficient to mutilate the body of the ticket at those portions so as to render it impossible to alter the printed matter upon such portions without such alteration being easily detected. When the ticket 4 has been issued from the machine by the rollers 1 and 2, the roller 2 is arrested by a yieldingly controlled retaining roller 5, arranged to engage within a depression 6 formed in the periphery of the roller 2. The retaining roller 5 is mounted upon an arm 7 pivotally mounted upon a pin 8 and arranged to bear upon the periphery of the roller 2 under the action of a leaf spring 9 and a spring 13. The spring 13 holds the roller 5 lightly in contact with the periphery of the roller 2, irrespective of the action of the leaf spring 9. The leaf spring 9 is arranged to engage with the periphery of the printing member 10 which is provided with a cam surface 11 arranged upon the member 10 so that the retaining roller 5 is no longer urged into the depression 6 in the roller 2 by the spring 9 as and when a ticket 4 is fed to the rollers 1 and 2. As the printing member 10 approaches the end of its motion the cam face 11 again urges the roller 5 strongly, by means of the leaf spring 9, to arrest the free roller 2 by the entry of the roller 5 into the depression 6.

The rollers 1 and 2 are respectively provided with ribs 14 and lands 15 so arranged upon the respective rollers that when a ticket is fed between the rollers there are formed at predetermined portions of the ticket ribbing, scoring or grooving sufficient to mutilate the body of the ticket at these portions so as to render it impossible to alter the printed matter upon such portions without its being easily detected.

The roller 2 is carried by ball bearings 17 which are secured to rod 12. Rod 12 is preferably carried in eccentric mountings 18 so as to enable the pressure between the rollers 1 and 2 to be easily adjusted.

It is to be understood that the expression "mutilation" is intended to cover any means of treating the portion or portions of the ticket which carry the essential particular or particulars of a race that any fraudulent attempt to alter any such particular or particulars becomes apparent.

What I claim and desire to protect by Letters Patent is:

1. In a ticket printing and issuing machine, means for printing a ticket, means for feeding the printed ticket to a pair of rollers having surfaces which mesh over only predetermined portions of their areas whereby the ticket is mutilated at corresponding predetermined areas on passing between said rollers, one of said rollers being driven in synchronism with said printing means and the other of said rollers being driven only by the first roller through the medium of the ticket, and a detent actuated by means cooperating with said printing means for maintaining the roller which is driven through the medium of the ticket in a predetermined position with respect to the first roller when a ticket is not being fed between the rollers.

2. In a ticket printing and issuing machine, means for printing a ticket, means for feeding the printed ticket through a pair of rollers, a first of said rollers having a plurality of peripheral ribs and being driven in synchronism with the printing means, the second of said rollers having over only predetermined portions of its area surfaces which mesh with the ribs of the first roller whereby the ticket is mutilated at corresponding predetermined areas on passing between said rollers, the second roller being driven only by the first roller through the medium of the ticket, and a detent responsive to the position of the printing means for maintaining the second roller in a predetermined position with respect to the first roller when a ticket is not being fed between the rollers to insure proper relative positions of the rollers for providing mutilation of only the predetermined area of a ticket when fed therethrough, said mutilated area being spaced inwardly from all the edges of the ticket.

3. In a ticket printing and issuing machine, means for printing a ticket, means for feeding the printed ticket to a pair of rollers having surfaces which mesh over only predetermined portions of their areas whereby the ticket is mutilated at corresponding predetermined areas on passing between said rollers, one of said rollers being driven in synchronism with the printing means and the other of said rollers being driven only by the first roller through the medium of the ticket, and means including a detent and means cooperating with said printing means and responsive to the position of said printing means for actuating said detent for maintaining the roller which is driven through the medium of the ticket in a predetermined position with respect to the first roller when a ticket is not being fed between the rollers to insure proper relative positions of the rollers for providing mutilation of only the predetermined area of a ticket when fed therethrough.

CHRISTOPHER FREDERICK WEBB.

REFERENCES CITED

The following references are of record in the file of this patent:

UNITED STATES PATENTS

| Number | Name | Date |
| --- | --- | --- |
| 262,938 | Dyer | Aug. 22, 1882 |
| 900,622 | Wait | Oct. 6, 1908 |
| 1,338,366 | Heberling | Apr. 27, 1920 |
| 1,480,025 | Spear | Jan. 8, 1924 |
| 1,647,560 | Chisholm | Nov. 1, 1927 |
| 1,765,951 | Sullivan | June 24, 1930 |
| 1,928,234 | Simonsen | Sept. 26, 1933 |
| 1,939,081 | Prager | Dec. 12, 1933 |
| 1,975,891 | Aborn | Oct. 9, 1934 |
| 1,978,535 | Jacob | Oct. 30, 1934 |